US010300434B2

(12) United States Patent
Thijssen et al.

(10) Patent No.: US 10,300,434 B2
(45) Date of Patent: May 28, 2019

(54) REACTIVE COMPOSITION BASED ON SODIUM BICARBONATE AND PROCESS FOR ITS PRODUCTION

(71) Applicant: SOLVAY SA, Brussels (BE)

(72) Inventors: Marc Thijssen, Overijse (BE); Patrick Perrin, Barreda Torrelavega (ES); Jorge Alejandro Kabbabe Malave, Nancy (FR)

(73) Assignee: Solvay SA, Brussels (BE)

(*) Notice: Subject to any disclaimer, the term of this patent is extended or adjusted under 35 U.S.C. 154(b) by 0 days.

(21) Appl. No.: 15/114,588

(22) PCT Filed: Feb. 10, 2015

(86) PCT No.: PCT/EP2015/052742
§ 371 (c)(1),
(2) Date: Jul. 27, 2016

(87) PCT Pub. No.: WO2015/118166
PCT Pub. Date: Aug. 13, 2015

(65) Prior Publication Data
US 2016/0339386 A1 Nov. 24, 2016

(30) Foreign Application Priority Data

Feb. 10, 2014 (EP) ..................... 14154412
Jun. 6, 2014 (EP) ..................... 14171599

(51) Int. Cl.
| | | |
|---|---|---|
| *B01J 20/04* | (2006.01) | |
| *B01J 20/22* | (2006.01) | |
| *B01J 20/28* | (2006.01) | |
| *B01D 53/02* | (2006.01) | |
| *B01D 53/86* | (2006.01) | |
| *B01D 53/40* | (2006.01) | |
| *B01D 53/50* | (2006.01) | |
| *B01D 53/68* | (2006.01) | |
| *B01D 53/83* | (2006.01) | |

(52) U.S. Cl.
CPC ......... *B01D 53/8625* (2013.01); *B01D 53/40* (2013.01); *B01D 53/508* (2013.01); *B01D 53/685* (2013.01); *B01D 53/83* (2013.01); *B01J 20/043* (2013.01); *B01J 20/22* (2013.01); *B01J 20/28004* (2013.01); *B01D 53/02* (2013.01); *B01D 2251/206* (2013.01); *B01D 2251/208* (2013.01); *B01D 2251/304* (2013.01); *B01D 2251/606* (2013.01); *B01D 2251/70* (2013.01); *B01D 2251/80* (2013.01); *B01D 2253/25* (2013.01); *B01D 2253/304* (2013.01); *B01D 2257/2045* (2013.01); *B01D 2258/0283* (2013.01); *B01D 2258/0291* (2013.01)

(58) Field of Classification Search
None
See application file for complete search history.

(56) References Cited

U.S. PATENT DOCUMENTS

| | | |
|---|---|---|
| 3,868,444 A | 2/1975 | Frevel et al. |
| 5,002,741 A | 3/1991 | Hooper |
| 5,630,991 A | 5/1997 | Gal et al. |
| 5,830,422 A | 11/1998 | Kresnyak et al. |
| 6,171,567 B1 | 1/2001 | Fagiolini |
| 6,180,074 B1 * | 1/2001 | Fourcot ................ B01D 53/508 23/296 |
| 6,290,872 B1 | 9/2001 | Fourcot et al. |
| 7,909,272 B2 | 3/2011 | Thuijssen et al. |
| 2007/0196255 A1 * | 8/2007 | Sherman ............... B01D 53/507 423/215.5 |
| 2010/0290965 A1 | 11/2010 | Pfeffer et al. |
| 2010/0290967 A1 | 11/2010 | Detournay et al. |

FOREIGN PATENT DOCUMENTS

| | | |
|---|---|---|
| CL | 39781 A | 5/1997 |
| EP | 2377595 A1 | 10/2011 |
| FR | 2895286 A1 | 6/2007 |
| FR | 2926027 A1 | 7/2009 |
| WO | WO9519835 A1 | 7/1995 |
| WO | WO97016376 A1 | 5/1997 |
| WO | WO97016377 A1 | 5/1997 |
| WO | WO2013137416 A1 | 9/2013 |
| WO | WO2015118165 A1 | 8/2015 |

OTHER PUBLICATIONS

"Soap." IUPAC Compendium of ChemicalTechnology (2$^{nd}$ Ed.), 1997. Viewed May 10, 2018 at https://web.archive.org/web/20071111180035/http://goldbook.iupac.org:80/S05721.html.*
John R. Carson, "Removal of Sulfur Dioxide and Nitric Oxide From a Flue Gas Stream by Two Sodium Alkalis of Various Sizes." Trace: Tennessee Research and Creative Exchange, Master's Thesis, University of Tennessee, Knoxville Aug. 1980. (102 pgs).
Jochen Blumback, "Organic Components Reduction (PCDD/PCDF/PCB) in Flue-Gases and Residual Materials from Waste Incinerators by Use of Carbonaceous Adsorbents." Marker Umwelttechnic GmbH, D-86655 Harburg, Germany; Chemosphere, vol. 32, No. 1, pp. 119-131, 1996; Elsevier Science Ltd. Printed in Great Britain. (13 pg).
Official Journal of the European Union, Regulation (EC) No. 1272/2008 of the European Parliament and of the Council of Dec. 16, 2008 on Classification, Labelling and Packaging of Substances and Mixtures, Amending and Repealing Directives 67/548/EEC and 1999/45/EC, and Amending Regulation (EC) No. 1907/2006. (3 pgs).
Ullmann's Encyclopedia of Industrial Chemistry, "Sodium Carbonates", Christian Thieme, Solvay Alkali GmbH, Solingen, Federal Republic of Germany; @2012 vol. 33. p. 299-317 Wiley-VCH Verlag GmbH & Co. KGaA, Weinheim DOI: 10.1002/14356007. a24_299. (19 pgs).
U.S. Appl. No. 15/114,586, Marc Thijssen, et al., filed Jul. 27, 2016, WO2015118165.

* cited by examiner

Primary Examiner — Daniel Berns
(74) Attorney, Agent, or Firm — Beatrice C. Ortego

(57) ABSTRACT

A reactive composition comprising between 60% and 98% by weight of sodium bicarbonate, between 1% and 40% by weight of sodium carbonate and between 0.02% and 2.0% by weight of ammonia, expressed in the form of ammonium ions $NH_4^+$, and comprising from 0.01 to 5% by weight of a compound selected from the group consisting of hydrocarbons, fatty alcohols, fatty acids, and fatty acid salts.

20 Claims, No Drawings

REACTIVE COMPOSITION BASED ON SODIUM BICARBONATE AND PROCESS FOR ITS PRODUCTION

CROSS-REFERENCE TO RELATED APPLICATIONS

The present patent application is a U.S. national phase entry under 35 U.S.C. § 371 of International Application No. PCT/EP2015/052742 filed Feb. 10, 2015, which claims the priority of European patent application No. 14154412.2 filed on Feb. 10, 2014 and European patent application No. 14171599.5 filed on Jun. 6, 2014, the entire content of each of these applications being incorporated herein by reference for all relevant purposes.

TECHNICAL FIELD

The invention relates to a reactive composition based on sodium bicarbonate. It relates more particularly to a reactive composition which can be used to purify a flue gas comprising impurities, for example a flue gas produced by the incineration of waste or the combustion of fossil fuels for the production of electricity. The invention also relates to a process for the production of this reactive composition and to a process for the purification of flue gases using it.

TECHNICAL BACKGROUND

Incineration is a technology which is becoming essential for the removal of household or municipal waste. The incineration of household waste is accompanied by the formation of a flue gas generally comprising hydrogen chloride. It is essential to remove the hydrogen chloride from the flue gas before discharging the latter to the atmosphere.

During the combustion of coal, for example in order to produce electricity, flue gases are emitted comprising sulphur oxides as acidic impurities.

A known process for purifying a flue gas comprising acidic compounds consists in treating the flue gas with sodium bicarbonate, so as to neutralize hydrogen chloride or sulphur oxides and to form sodium chloride or sodium sulphates.

More particularly, a process has been provided in which sodium bicarbonate is injected in the powder form into the flue gas exiting from the incinerator and the flue gas thus treated is subsequently sent to a filter (Solvay & Cie, brochure TR 895/5c-B-1-1290). In this known process, the flue gas has a temperature of less than 260° C. at the point of injection of the sodium bicarbonate. The latter is employed in the form of a graded powder obtained by grinding, 90% by weight of which is in the form of particles with a diameter of less than 16 μm.

In practice, the sodium bicarbonate powder employed in this known process also comprises sodium carbonate.

WO 95/19835 discloses a reactive composition based on sodium bicarbonate which has a high bicarbonate content and which is provided in the form of a powder formed of particles, the particles having a specific distribution of dimensions. This composition is remarkably effective but is expensive.

In order to be able to generalize the application of purification treatments to the flue gases produced by industrial processes, it is important in many cases to reduce the cost of the reactants used.

EP 0 858 429 describes a composition comprising at least 80% of sodium bicarbonate, less than 20% by weight of sodium carbonate, from 0.2% to 0.7% by weight of ammonia, expressed as ammonium ions, and 2 to 10% by weight of water. This composition, obtained by heat treatment of crude bicarbonate from an ammonia-soda plant, however releases high amounts of ammonia ($NH_3$) when stored, in particular in closed atmospheres. This generates rapidly ammonia concentrations above toxicity thresholds that are detrimental to the health of people handling such composition.

The invention is targeted at providing a reactive composition based on sodium bicarbonate which can be used in treatments for the purification of flue gases, presenting high amount of ammonia compounds useful in flue gas mitigation of nitrogen oxides by catalytic conversion to nitrogen, though releasing less ammonia during storage and handling than known compositions of the prior art. Moreover, the invention relates also to a process that renders possible to produce this composition under advantageous economic conditions.

SUMMARY OF THE INVENTION

The invention consequently relates to a reactive composition comprising between 60% and 98%, preferably between 80 and 98%, by weight of sodium bicarbonate, between 1% and 40%, preferably between 1% and 12% by weight of sodium carbonate and between 0.02% and 2.0% by weight of ammonia, expressed in the form of ammonium ions $NH_4^+$, and comprising from 0.01 to 5% by weight of a compound selected from hydrocarbons, fatty alcohols, fatty acids, or fatty acid salts, preferably fatty acids having 12 to 20 carbon atoms per molecule or a salt thereof.

One advantage of the present invention is to provide a reactive composition with decreased ammonia release during storage and handling compared to same composition but without added compound. A second advantage of the reactive composition according to the invention is to provide an enhanced effectiveness of acidic gasses neutralization such as HCl or $SO_x$, when used in flue gas mitigation, showing a decrease of consumption of alcaline compounds from 8 to 15% per ton of incinerated municipal solid waste (MSW) compared to known reactive compounds comprising sodium bicarbonate.

A third advantage of the present invention is to render possible the manufacturing, the storage and improved handling of ready to use reactive composition for flue gas mitigation, that does not need to be milled before its introduction in the flue gasses.

A fourth advantage of the present invention is to provide a reactive composition enabling 15 to 20% savings in ammoniated water used in catalytic SCR for flue gas mitigation of NOx.

DETAILED DESCRIPTION OF THE INVENTION

Before the present formulations of the invention are described, it is to be understood that this invention is not limited to particular formulations described, since such formulations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise. By way of example, "an additive" means one additive or more than one additives.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Throughout this application, the term "about" is used to indicate that a value includes the standard deviation of error for the device or method being employed to determine the value.

As used herein, the term "average" refers to number average unless indicated otherwise.

As used herein, the terms "% by weight", "wt %", "weight percentage", or "percentage by weight" are used interchangeably.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different alternatives, embodiments and variants of the invention are defined in more detail. Each alternative and embodiment so defined may be combined with any other alternative and embodiment, and this for each variant unless clearly indicated to the contrary or clearly incompatible when the value range of a same parameter is disjoined. In particular, any feature indicated as being preferred or advantageous may be combined with any other feature or features indicated as being preferred or advantageous.

Furthermore, the particular features, structures or characteristics described in present description may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

The invention can be defined by the features according to the following items:

Item 1. Reactive composition comprising between 80% and 98% by weight of sodium bicarbonate, between 1% and 12% by weight of sodium carbonate and between 0.02% and 2.0% by weight of ammonia, expressed in the form of ammonium ions $NH_4^+$, and comprising from 0.01 to 5% by weight of a compound selected from hydrocarbons, fatty alcohols, fatty acids, or fatty acid salts.

Item 2. Composition according to the preceding Item in the form of particles having a diameter $D_{90}$ of less than 50 μm and a diameter $D_{50}$ of less than 35 μm, preferably a diameter $D_{90}$ of less than 35 μm and a diameter $D_{50}$ of less than 20 μm, more preferably a diameter $D_{90}$ of less than 30 μm and a diameter $D_{50}$ of less than 15 μm, measured by laser diffractometry.

Item 3. Composition according to Items 1 or 2 comprising between 2% and 12% by weight of sodium carbonate.

Item 4. Composition according to one of the preceding Items, comprising between 85% and 95% by weight of sodium bicarbonate.

Item 5. Composition according to one of the preceding Items, comprising from 0.02% to 0.17% by weight of ammonia, expressed in the form of ammonium ions $NH_4^+$.

Item 6. Composition according to one of Items 1 to 4, comprising from 0.2% to 0.7% by weight of ammonia, expressed in the form of ammonium ions $NH_4^+$.

Item 7. Composition according to one of Items 1 to 4, comprising more than 0.7% and less than 2.0% by weight of ammonia, expressed in the form of ammonium ions $NH_4^+$.

Item 8. Composition according to one of the preceding Items characterized in that the composition comprises less than 8.0%, preferably less than 6%, more preferably less than 4%, even more preferably less than 2%, even more preferably less than 1%, even more preferably less than 0.9%, most preferred less than 0.8% by weight of water.

Item 9. Composition according to one of the preceding Items, comprising from 0.01% to 5% by weight of additives selected from zeolites, dolomite, magnesium hydroxide, magnesium (hydroxy) carbonate, lime, calcium carbonate, sodium chloride, zinc chloride, sodium sulphate, calcium fluoride, hydrocarbons, talc, lignite coke, and active charcoal.

Item 10. Process for the production of a composition according to one of the preceding Items, according to which:
  particles resulting from crude bicarbonate particles from an ammonia-soda plant comprising from 1% to 20% by weight of water are mixed with a compound selected from hydrocarbons, fatty alcohols, fatty acids, fatty acid salts to form a humid mixture comprising particles,
  the humid mixture comprising particles is introduced into a gas stream at a temperature of more than 50° C. comprising air, in order to form a gas stream laden with particles;
  the gas stream laden with particles is introduced into a mill in order to form a gas stream comprising ground particles having a diameter $D_{90}$ of less than 50 μm and a diameter $D_{50}$ of less than 35 μm, preferably a diameter $D_{90}$ of less than 35 μm and a diameter $D_{50}$ of less than 20 μm, more preferably a diameter $D_{90}$ of less than 30 μm and a diameter $D_{50}$ of less than 15 μm measured by laser diffractometry.

Item 11. Process according to the preceding Item, in which the crude bicarbonate particles from an ammonia-soda plant have a diameter $D_{90}$ of greater than 100 μm and a diameter $D_{50}$ of greater than 50 μm.

Item 12. Process according to one of Items 10 or 11, in which the crude bicarbonate particles from an ammonia-soda plant comprise at most 15%, preferably at most 8%, more preferably at most 6%, and even more preferably at most 5% in weight of water before being introduced into the gas stream.

Item 13. Process according to one of Items 10 to 12, in which the crude bicarbonate particles are mixed with other compounds, in particular with from 0.01% to 5% in weight additives.

Item 14. Reactive composition according to one of Items 1 to 9, which can be obtained by the process according to one of Items 10 to 13.

Item 15. Process for the purification of a flue gas comprising acidic impurities, such as hydrogen chloride or sulphur oxides, according to which a reactive composition according to one of Items 1 to 9 or is introduced into the flue gas, at a temperature of 125 to 600° C., and the flue gas is subsequently subjected to a filtration or a dedusting.

Item 16. Process according to Item 15 wherein the flue gas subjected to a filtration is subsequently subjected to a selective catalytic reduction of nitrogen oxides (SCR DeNOx).

Alternatively the invention can be defined by the features according to the following items:

Item 1'. Reactive composition comprising between 60% and 98% by weight of sodium bicarbonate, between 1% and 40% by weight of sodium carbonate and between 0.02% and 2.0% by weight of ammonia, expressed in the form of ammonium ions $NH_4^+$, and comprising from 0.01 to 5% by weight of a compound selected from hydrocarbons, fatty alcohols, fatty acids, or fatty acid salts.

Item 2'. Composition according to the preceding Item comprising between 80 and 98%, by weight of sodium bicarbonate.

Item 3'. Composition according to Items 1' or 2' comprising between 1% and 12% by weight of sodium carbonate.

Item 4'. Composition according to one of Items 1' to 3' comprising between 2% and 12% by weight of sodium carbonate.

Item 5'. Composition according to one of Items 1' to 4', comprising between 85% and 95% by weight of sodium bicarbonate.

Item 6'. Composition according to one of Items 1' to 5' in the form of particles having a diameter $D_{90}$ of less than 50 µm and a diameter $D_{50}$ of less than 35 µm, preferably a diameter $D_{90}$ of less than 35 µm and a diameter $D_{50}$ of less than 20 µm, more preferably a diameter $D_{90}$ of less than 30 µm and a diameter $D_{50}$ of less than 15 measured by laser diffractometry.

Item 7'. Composition according to one of the Items 1' to 6', comprising from 0.02% to 0.17% by weight of ammonia, expressed in the form of ammonium ions $NH_4^+$.

Item 8'. Composition according to one of Items 1' to 6', comprising from 0.2% to 0.7% by weight of ammonia, expressed in the form of ammonium ions $NH_4^+$.

Item 9'. Composition according to one of Items 1' to 6', comprising more than 0.7% and less than 2.0% by weight of ammonia, expressed in the form of ammonium ions $NH_4^+$.

Item 10'. Composition according to one of Items 1' to 9' characterized in that the composition comprises less than 8.0%, preferably less than 6%, more preferably less than 4%, even more preferably less than 2%, even more preferably less than 1%, even more preferably less than 0.9%, most preferred less than 0.8% by weight of water.

Item 11'. Composition according to one of Items 1' to 10', comprising from 0.01% to 5% by weight of additives selected from zeolites, dolomite, magnesium hydroxide, magnesium (hydroxy) carbonate, lime, calcium carbonate, sodium chloride, zinc chloride, sodium sulphate, calcium fluoride, hydrocarbons, talc, lignite coke, activated carbon, and active charcoal.

Item 12'. Process for the production of a composition according to one of Items 1' to 11', according to which:

a) particles resulting from crude bicarbonate particles from an ammonia-soda plant comprising from 1% to 20% by weight of water are mixed with a compound selected from hydrocarbons, fatty alcohols, fatty acids, fatty acid salts to form a humid mixture comprising particles, b) the humid mixture comprising particles is introduced into a gas stream at a temperature of more than 30° C., preferably more than 50° C., generally comprising air, in order to form a gas stream laden with particles;

c) the gas stream laden with particles is introduced into a mill in order to form a gas stream comprising ground particles having a diameter $D_{90}$ of less than 100 µm and a $D_{50}$ of less than 75 µm, preferably a $D_{90}$ of less than 50 µm and a diameter $D_{50}$ of less than 35 µm, more preferably a diameter $D_{90}$ of less than 35 µm and a diameter $D_{50}$ of less than 20 µm, even more preferably a diameter $D_{90}$ of less than 30 µm and a diameter $D_{50}$ of less than 15 µm measured by laser diffractometry.

Item 13'. Process according to the preceding Item, in which the crude bicarbonate particles from an ammonia-soda plant have a diameter $D_{90}$ of greater than 80 µm, preferably greater than 100 and a diameter $D_{50}$ of greater than 40 µm, preferably greater than 50 µm.

Item 14'. Process according to one of Items 12' or 13', in which the crude bicarbonate particles from an ammonia-soda plant comprise at most 15%, preferably at most 12%, more preferably at most 10%, and even more preferably at most 8% in weight of water before being introduced into the gas stream.

Item 15'. Process according to one of Items 12' to 14', in which the crude bicarbonate particles from an ammonia-soda plant comprise at least 2%, more advantageously at least 3% by weight of water when mixed with a compound selected from hydrocarbons, fatty alcohols, fatty acids, fatty acid salts to form a humid mixture comprising particles.

Item 16'. Process according to one of Items 12' to 15', in which the crude bicarbonate particles are mixed with other compounds, in particular with from 0.01% to 5% in weight additives.

Item 17'. Reactive composition according to one of Items 1' to 11', which can be obtained by the process according to one of Items 12' to 16'.

Item 18'. Process for the purification of a flue gas comprising acidic impurities, such as hydrogen chloride or sulphur oxides, according to which a reactive composition according to one of Items 1' to 11' or 17' is introduced into the flue gas, at a temperature of 100 to 600° C., and the flue gas is subsequently subjected to a filtration or a dedusting.

Item 19'. Process according to Item 18' wherein the flue gas subjected to a filtration is subsequently subjected to a selective catalytic reduction of nitrogen oxides (SCR DeNOx).

Further alternatively the invention can be defined by the features according to the following items:

Item 1''. Reactive composition comprising between 60% and 98% by weight of sodium bicarbonate, between 1% and 40% by weight of sodium carbonate and between 0.02% and 2.0% by weight of ammonia, expressed in the form of ammonium ions $NH_4^+$, and comprising from 0.01 to 5% by weight of a compound selected from hydrocarbons, fatty alcohols, fatty acids, or fatty acid salts.

Item 2''. Composition according to Item 1'' wherein the compound is selected from fatty acids having 12 to 20 carbon atoms per molecule or a salt thereof Item 3". Composition according to Item 2" wherein the fatty acid salt is a magnesium or calcium salt or a fatty acid soap.

Item 4". Composition according to Item 2" or 3" wherein the fatty acid is selected from the group consisting of lauric acid, myristic acid, palmitic acid, stearic acid, oleic acid, linoleic acid and mixtures thereof.

Item 5". Composition according to one of Items 1" to 4" comprising between 80 and 98%, by weight of sodium bicarbonate.

Item 6". Composition according to one of Items 1" to 5" comprising between 1% and 12% by weight of sodium carbonate, preferably between 2% and 12% by weight of sodium carbonate.

Item 7". Composition according to one of Items 1" to 6", comprising between 85% and 95% by weight of sodium bicarbonate.

Item 8". Composition according to one of Items 1" to 7" in the form of particles having a diameter $D_{90}$ of less than 50 μm and a diameter $D_{50}$ of less than 35 μm, preferably a diameter $D_{90}$ of less than 35 μm and a diameter $D_{50}$ of less than 20 μm, more preferably a diameter $D_{90}$ of less than 30 μm and a diameter $D_{50}$ of less than 15 μm, measured by laser diffractometry.

Item 9". Composition according to one of Items 1" to 8", comprising from 0.02% to 0.17% by weight of ammonia, expressed in the form of ammonium ions $NH_4^+$.

Item 10". Composition according to one of Items 1" to 8", comprising from 0.2% to 0.7% by weight of ammonia, expressed in the form of ammonium ions $NH_4^+$.

Item 11". Composition according to one of Items 1" to 8", comprising more than 0.7% and less than 2.0% by weight of ammonia, expressed in the form of ammonium ions $NH_4^+$.

Item 12". Composition according to one of Items 1" to 11" characterized in that the composition comprises less than 1%, preferably less than 0.5%, more preferably less than 0.4%, even more preferably less than 0.3% by weight of water.

Item 13". Process for the production of a composition according to one of Items 1" to 12", according to which:
a) particles resulting from crude bicarbonate particles from an ammonia-soda plant comprising from 1% to 20% by weight of water are mixed with a compound selected from fatty acids having 12 to 20 carbon atoms per molecule or a salt thereof to form a humid mixture comprising particles,
d) the humid mixture comprising particles is introduced into a gas stream at a temperature of more than 30° C., preferably more than 50° C., generally comprising air, in order to form a gas stream laden with particles;
e) the gas stream laden with particles is introduced into a mill in order to form a gas stream comprising ground particles having a diameter $D_{90}$ of less than 100 μm and a $D_{50}$ of less than 75 μm, preferably a $D_{90}$ of less than 50 μm and a diameter $D_{50}$ of less than 35 μm, more preferably a diameter $D_{90}$ of less than 35 μm and a diameter $D_{50}$ of less than 20 μm, even more preferably a diameter $D_{90}$ of less than 30 μm and a diameter $D_{50}$ of less than 15 μm measured by laser diffractometry.

Item 14". Process for the purification of a flue gas comprising acidic impurities, such as hydrogen chloride or sulphur oxides, according to which a reactive composition according to one of Items 1" to 12" is introduced into the flue gas, at a temperature of 100 to 600° C., and the flue gas is subsequently subjected to a filtration or a dedusting.

Item 15". Process according to Item 14" wherein the flue gas subjected to a filtration is subsequently subjected to a selective catalytic reduction of nitrogen oxides (SCR DeNOx).

Item 16". Use of a compound selected from fatty acids having 12 to 20 carbon atoms per molecule or a salt thereof as additive to reduce ammonia release during storage or during handling of a reactive composition comprising between 60% and 98% by weight of sodium bicarbonate, between 1% and 40% by weight of sodium carbonate and between 0.02% and 2.0% by weight of ammonia, expressed in the form of ammonium ions $NH_4^+$.

Item 17". Use according to Item 16" to reduce ammonia release during storage or during handling of a reactive composition according to one of Item 3" to 12".

Item 18". Composition according to one of Items 1" to 12" wherein the ammonia content, expressed in the form of ammonium ions $NH_4^+$, is measured by distillation of an aqueous solution obtained by dissolving the sample in deionized water alkalinized with caustic soda at pH of at least 11 (alkaline distillation method; second alternative form below).

The inventors have observed, as a first advantage, that such a reactive composition presents a reduced release of ammonia when stored or handled compared to previously known compositions, though being still very effective for numerous applications, in particular for the treatment of flue gases, despite its low bicarbonate content in comparison with standard technical bicarbonate.

In the invention, generally, the ammonia is defined as being gaseous ammonia ($NH_3$), adsorbed and absorbed in the particles based on sodium bicarbonate, as measured, by heating at 30° C. during two hours.

In a first alternative form, it is advantageous for the ammonia under consideration to also comprise the gaseous ammonia released by heating at 120° C. during 2 hours, of the ammonium bicarbonate, ammonium carbonate, ammonium carbamate and other instable ammonium compounds at this temperature. In a second alternative form, which is the preferred form (so-called alkaline distillation method), the ammonia comprises also the ammonia released by distillation of an aqueous solution obtained by dissolving the sample in deionized water alkalinized with caustic soda at pH of at least 11, and enabling the measurement of ammonium species such as ammonium bicarbonate, ammonium carbonate, ammonium carbamate, sodium carbamate, ammonium chloride, and other ammonium salts such as the ammonium salts contained in crude sodium bicarbonate obtained from the ammonia Solvay process. In a third alternative form, the ammonia comprises any ammonia-comprising entity. In this case, the total nitrogen, expressed in the form of ammonium ions, is measured. The three of these alternative forms can be applied to all the embodiments described in this account, in which embodiments an ammonia content is specified.

The determination according to the invention and the first alternative form of the ammonia expressed in the form of ammonium ions $NH_4^+$ of a product sample is done by capturing the released gaseous ammonia ($NH_3$) from the heating operation by condensation in a scrubber with a HCl solution to transform the ammonia into $NH_4^+$, which is analysed by a colorimeter.

The determination according to the second alternative form of the ammonia expressed in the form of ammonium ions $NH_4^+$ of a product sample is done by measurement with a spectro-colorimeter Docteur Lange X-500 on 150 mL of distillate from distilling a solution of 50 g of product, 150 mL of deionized water and 90 mL of a solution of caustic soda NaOH 9N. Cuvettes Dr Lange LCK 304, range 0.02-2.5 mg $NH_4^+$/L are used.

The determination according to the third alternative form of the ammonia expressed in the form of ammonium ions $NH_4^+$ of a product sample is done by measurement by spectrophotometry of a solution sample by using a kit of Dr Lange LCK 338 Total Nitrogen, range 20-100 mg/L. Inorganically and organically bonded nitrogen is oxidized to nitrate by digestion with peroxodisulphate. The nitrate ions react with 2.6-dimethylphenol in a solution of sulphuric and phosphoric acid to form a nitrophenol. Alternatively the determination according to the third alternative form of the ammonia expressed in the form of ammonium ions $NH_4^+$ of a product sample is done by transfonning all the ammonia species ($NH_4Cl$, $NH_4HCO_3$, sodium carbamate, ammonium carbamate) into acidic form of $NH_4^+$, and then potentiometric titration of $NH_4^+$ with NaClO in a bicarbonate assay medium according the following reaction:

$$2\ NH_4^+ + NaClO \rightarrow NaCl + 2H^+ + 3\ H_2O + N_2$$

For this determination 5 g of the product sample is dissolved into 50 ml of deionized water in presence of methyl orange as pH indicator (pH 3.1-4.4), acidified with $H_2SO_4$ 2N down to orange colour change, then 50 ml of a saturated solution with sodium bicarbonate is added, and the point of equivalence when adding a NaClO solution of 0.2N, is determined by potentiometry.

In an advantageous embodiment of present invention, the composition is provided in the form of particles having a diameter $D_{90}$ of less than 100 µm and a diameter $D_{50}$ of less than 75 µm, preferably a diameter $D_{90}$ of less than 50 µm and a diameter $D_{50}$ of less than 35 µm, more preferably a diameter $D_{90}$ of less than 35 µm and a diameter $D_{50}$ of less than 20 µm, even more preferably a diameter $D_{90}$ of less than 30 µm and a diameter $D_{50}$ of less than 15 µm, measured by laser diffractometry. When the particles of the composition have a diameter $D_{90}$ of less than 30 µm and a diameter $D_{50}$ of less than 15 µm, it is even more advantageous that the $D_{50}$ to be less than 12 µm, preferably less than 10 µm.

Indeed, it has been observed in the applications for the treatment of flue gases, that the combination between the specific distribution of the diameters of the particles of the composition according to the invention, having a few large particles, and between the specific content of ammonia has appeared essential for its effectiveness. The ammonia content has a beneficial effect on the catalytic reduction of nitrogen oxides, on the height of the specific surface ($m^2$/g BET) of the bicarbonate particles after thermal transformation into sodium carbonate and thus on the efficiency of the sorbent. Without wishing to be committed to a theoretical explanation, the inventors believe that this second advantage of present reactive composition is due to the ammonia content closely related to the particle size distribution, with which it is in equilibrium.

Advantageously the reactive composition of the present invention comprises between 2% and 12%, more advantageously between 2% and 10% by weight of sodium carbonate.

It is recommended that the reactive composition comprises between 85% and 95% by weight of sodium bicarbonate.

Advantageously, the hydrocarbons of the present composition are fatty alcools molecules, or fatty acids molecules, which comprise 12 to 20 carbon atoms ($C_{12}$-$C_{20}$).

More advantageously, the hydroarbons are fatty acids selected from lauric acid, myristic acid, palmitic acid, linoleic acid, oleic acid, stearic acid, and mixtures thereof. Stearic acid is preferred. It is particularly advantageous that the corresponding fatty acid (i.e. the fatty acid or the fatty acid counter part of the fatty acid salt) have a melting point of less than 80° C., preferably less than 75° C.

Fatty acid salts are advantageously selected from calcium, or magnesium acid salts or soaps of the fatty acids. More advantageously, the calcium or magnesium fatty acid salts are selected from calcium or magnesium salt of: lauric acid, myristic acid, palmitic acid, linoleic acid, oleic acid, stearic acid, and mixtures thereof Fatty acid salt is preferably selected from calcium stearate, magnesium stearate.

In an advantageous embodiment, the reactive composition is provided in the form of particles having a particles size distribution slope σ of less than 2.

The particles size distribution slope σ is defined by:

$$\sigma = \frac{D_{90} - D_{10}}{D_{50}}$$

$D_{90}$, respectively $D_{50}$ and $D_{10}$, represent the equivalent diameter for which 90% (respectively 50% and 10%) of the weight of the particles of the reactive composition have a diameter of less than $D_{90}$ (respectively $D_{50}$ and $D_{10}$). These particle size parameters are defined by the laser ray diffraction analytical method.

Advantageously the reactive composition of present composition is a powder with a free flowing density of at least 0.4, preferably at least 0.45, more preferably at least 0.50 kg/dm³. Generally the free flowing density of the reactive composition of present composition is at most 0.8, or at most 0.7, or at most 0.6, or at most 0.55 kg/dm³.

According to a first variant of the invention, the composition comprises between 0.02% and 0.17% by weight of ammonia, expressed in the form of ammonium ions $NH_4^+$. This first variant is particularly advantageous for use of the composition in animal food, as ammonia release is particularly low in closed environment. Such compositions show also particularly low caking behaviour during storage in silos or big bags.

According to a second variant of the invention, the composition comprises from 0.2% to 0.7% by weight of ammonia, expressed in the form of ammonium ions $NH_4^+$. This second variant is advantageous for providing larger ammonia amount in flue gas mitigation use, and though presenting a lower ammonia release at room temperature during storage compared to prior art.

According to a third variant of the invention, the composition comprises more than 0.7% and less than 2.0% by weight of ammonia, more advantageously more than 0.8% and less than 2.0% by weight of ammonia, expressed in the form of ammonium ions $NH_4^+$. This third variant is advantageous for providing larger ammonia amount in flue gas mitigation use, and is particularly advantageous with the above described specific distribution of the diameters of the particles of the composition, having a few large particles, showing an improved effect on the catalytic reduction of nitrogen oxides.

In the present invention, it is advantageous that the reactive composition comprises less than 8% by weight of water. Preferably, the reactive composition comprises less than 6%, more preferably less than 4%, even more preferably less than 2%, even more preferably less than 1%, even more preferably less than 0.9%, most preferred less than 0.8% by weight of water, or at most 0.7%, or at most 0.5% by weight of water. There is no need for the present composition to have very low amount of water to provide a decreased release of ammonia during storage. Moreover a very low amount of water is detrimental to the quality of the reactive composition, as most of the techniques of drying sodium bicarbonate lead also to a loss of sodium bicarbonate and to an increase of sodium carbonate content. The reactive composition comprises generally at least 0.01%, or at least 0.05%, or at least 0.1%, or at least 0.2% by weight of water. The amount of water is generally measured by weight loss at a temperature of 25° C. placing about 3 g of the composition in a watch-glass and in a dissicator in presence of silicagel under vacuum at about 50 mbar absolute pressure, during 24 hours. In present description 'free water' due to liquid water absorbed on the composition (to be distinguished to linked water to the crystals of sodium carbonate such as for instance sodium carbonate monohydrate crystals) is measured by the loss of weight during 16 hours of a sample placed in a ventilated lab oven heated at 30° C.

The reactive composition according to the invention can also comprise one or more solid or liquid additives in order to improve, for example, the storage or flowability thereof, or to improve effectiveness of the product in flue gas treatment. Some additives can also further reduce the release of gaseous ammonia and ammonia smell by the composition at room temperature. The additives are advantageously selected from zeolites, dolomite, magnesium hydroxide, magnesium (hydroxy) carbonate, lime, calcium carbonate, sodium chloride, zinc chloride, sodium sulphate, calcium fluoride, talc, lignite coke, and active charcoal.

The reactive composition according to the invention can preferably comprise from 0.01% to 5% by weight of additives.

The invention also relates to a process for the production of the reactive composition according to the invention. It has been observed that a minimum temperature is needed to decrease the amount of water in compositions such as the ones described supra, in particular in crude sodium bicarbonate from an ammonia soda plant. In particular the invention relates to a process for the production of the composition according the present invention, according to which particles resulting from crude bicarbonate particles from an ammonia-soda plant are thermally treated at a temperature of more than 30° C. More particularly in this process:

a) particles resulting from crude bicarbonate particles from an ammonia-soda plant comprising from 1% to 20% by weight of water are mixed with a compound selected from hydrocarbons, fatty alcohols, fatty acids, fatty acid salts to form a humid mixture comprising particles,
b) the humid mixture comprising particles is introduced into a gas stream at a temperature of more than 30° C., preferably more than 50° C., generally comprising air, in order to form a gas stream laden with particles;
c) the gas stream laden with particles is introduced into a mill in order to form a gas stream comprising ground particles having a diameter $D_{90}$ of less than 100 μm and a $D_{50}$ of less than 75 μm, preferably a $D_{90}$ of less than 50 μm and a diameter $D_{50}$ of less than 35 μm, more preferably a diameter $D_{90}$ of less than 35 μm and a diameter $D_{50}$ of less than 20 μm, even more preferably a diameter $D_{90}$ of less than 30 μm and a diameter $D_{50}$ of less than 15 μm measured by laser diffractometry.

In the present invention, at step a), the mixing of the particles and the compound can be realized in a mixer such as a plough mixer. The mixing can be realized also by co-introducing the particles and the compound in the gas stream at a temperature of more than 30° C. of step b) and then the gas stream laden with the particles and the compound is introduced in the mill at step c) so that to obtain the ground particles.

In the present process, the temperature of the gas stream wherein the humid mixture comprising particles is introduced into, is preferably more than 40° C., more preferably more than 50° C., even more preferably more than 60° C., or more than 70° C., or more than 80° C.

In the present process it is advantageous that the particles resulting from crude bicarbonate particles from an ammonia-soda plant comprises at most 20%, more advantageously at most 14%, preferably at most 8%, more preferably at mots 6% by weight of water when mixed with a compound selected from hydrocarbons, fatty alcohols, fatty acids, fatty acid salts to form a humid mixture comprising particles. For lowering the water content of the particles resulting from crude bicarbonate particles, it is advantageous that the crude bicarbonate to be 'dewatered' in a dryer, such as a fluidized bed. In general the particles resulting from crude bicarbonate particles from an ammonia-soda plant comprises at least 2%, more advantageously at least 3% by weight of water when mixed with a compound selected from hydrocarbons, fatty alcohols, fatty acids, fatty acid salts to form a humid mixture comprising particles.

In this process, the reactive composition is produced starting from crude bicarbonate particles from an ammonia-soda plant. This sodium bicarbonate is the product obtained by carbonation, with a gas comprising $CO_2$, of an ammoniacal brine. The particles formed at the end of the carbonation are separated from the slurry by filtration, in order to form the crude bicarbonate particles from an ammonia-soda plant. The ammoniacal brine is obtained by reaction of ammonia with a sodium chloride solution. The crude bicarbonate from an ammonia-soda plant comprises predominantly sodium bicarbonate but also sodium carbonate, ammonia, some other compounds in small amounts and water. In the complete industrial process for the production of sodium bicarbonate, the crude sodium bicarbonate is successively calcined (in order to produce "light" sodium carbonate, this calcination moreover producing $CO_2$), then dissolved, recarbonated with $CO_2$ and finally recrystallised. This transformation sequence exhibits a high cost, in particular a high energy cost (especially the calcination and recrystallisation). The use in the process according to the invention of crude bicarbonate particles from a soda plant is thus of marked economic advantage.

In the first or second variant of the present invention, when the ammonia content of the crude bicarbonate from a soda plant is too high, it is recommended for the crude bicarbonate particles from an ammonia-soda plant to be washed using a washing liquid before being introduced into the gas stream.

In the present invention, it is generally recommended to remove the excess liquid i.e. "dewatering" the crude sodium bicarbonate for example by passing over a belt filter, in a centrifuge, a rotary filter, or in a drying machine. The product can subsequently sometimes advantageously be dried. The drying of the particles can be realized on any appropriate equipment. Advantageously the drying is operated in a conveyor tunnel heated with hot gas, a fluid bed heated with hot gas, a fluidized bed heated indirectly with internal steam tubes, an agitated dryer, a rotary dryer, a direct heated rotary dryer with hot gas, an indirect heated rotary dryer heated with steam, a flash pneumatic conveyor dryer, or a gravity dryer. The drying can be performed as batch drying (loading the product in the dryer, drying and emptying the dryer) or as continuous drying operation (continuously feeding and continuously removing the dried product from the dryer). Generally the crude bicarbonate particles after 'dewatering' comprise at most 15%, preferably at most 12%, more preferably at most 10%, and even more preferably at most 8% in weight of water before being introduced into the gas stream. In a most preferred embodiment the crude bicarbonate particles after 'dewatering' comprise at most 6%, and even more preferably at most 5% in weight of water before being introduced into the gas stream. It is advantageous that the crude bicarbonate after dewatering comprises 2% to 8% of water, preferably 2% to 6% of water before that the particles resulting from crude bicarbonate particles are introduced into the gas stream at a temperature of more than 30° C. For the drying operations the temperature is generally between 30 and 130° C., or between 50 and 120° C., or preferably between 55 and 85° C. Hot gas stream up to 250° C. can be used for the thermal treatment. Though, the final temperature of the composition is generally lower due to water evaporation. The final temperature is preferably at most 130° C., more preferably at most 100° C., even more preferably at most 85° C., or even more preferably at most 80° C. If high amount of sodium bicarbonate is desired, the contact time of the composition with hot gasses is to be limited. The more the temperature of hot gasses after water evaporation is, the shorter the contact time is to be. After the drying of the composition, it is recommended that the composition to be cooled down to at most 50° C., preferably to at most 40° C., more preferably to at most 35° C. This enables to avoid further bicarbonate decomposition and ammonia release when handling and storing the composition.

Then the dried product fowling the composition generally comprises less than 1% by weight of water, or at most 0.9%, or at most 0.8%, or at most 0.7%, or preferably at most 0.5%, more preferably at most 0.3% by weight of water, and in particular of free water.

As mentioned above, in order to improve the flowability and generally the flow properties of the reactive composition, one or more additives, advantageously selected from zeolites, dolomite, magnesium hydroxide, magnesium (hydroxy) carbonate, lime, calcium carbonate, sodium chloride, zinc chloride, sodium sulphate, calcium fluoride, hydrocarbons, talc, lignite coke, and active charcoal, is (are) sometimes added to the composition. Some of these additives additionally have a beneficial effect during the use of the reactive composition. For example, calcium carbonate, lime, activated carbon or active charcoals have a beneficial effect when the reactive composition is used in the treatment of flue gas, in particular for the purification from hydrogen fluoride.

In an advantageous alternative form of the process according to the invention, the solid or liquid additive or additives are introduced into the gas stream in an amount varying from 0.01% to 5% by weight. It is sometimes preferable for this introduction to take place upstream of the mill, or just when the gas stream enters the mill. This is because it has been observed that these additives can also have a beneficial effect on the operation of the mill.

The invention also relates to the reactive composition which can be obtained by the process according to the invention. This composition is then obtained under highly advantageous economic conditions, starting from crude bicarbonate from an ammonia-soda plant. This composition is also obtained under very favourable energy conditions, as it requires neither the calcination nor the recrystallisation which are necessary to produce the normal sodium bicarbonates. The energy saving has a positive environmental impact.

Finally, the invention also relates to a process for the purification of a flue gas comprising acidic impurities, for example hydrogen chloride or sulphur oxides, according to which a reactive composition according to the invention, which can preferably be obtained by the process according to the invention, is introduced into the flue gas, at a temperature of 125 to 600° C., and the flue gas is subsequently subjected to a filtration. In particular flue gas comprising hydrogen chloride or sulphur dioxide are treated with the process according to the invention so that hydrogen chloride be less than 10 or less than 5 mg HCl/Nm$^3$ dry, and/or so that sulphur dioxide be less than 50 or less than 40 mg $SO_2$/Nm$^3$ dry (at 11% $O_2$). When the flue gas comprises nitrogen oxides ("NOx"), the process advantageously comprises a catalyst in order to treat the NOx, the catalyst being preferably incorporated into the filter. The ammonia content of the reactive composition according to the invention has a beneficial effect on the operation of the catalyst, as in the hot flue gas the composition will release gaseous ammonia ($NH_3$) and by substitution up to 24% of ammonia consumption can be saved.

Therefore the present invention also relates to a process for the purification of a flue gas comprising acidic impurities, for example hydrogen chloride or sulphur oxides, according to which a reactive composition according the present invention is introduced into the flue gas, at a temperature of at least 100, or at least 125° C., and generally at most 600° C., the flue gas is subsequently subjected to a filtration, and then subsequently subjected to a selective catalytic reduction of nitrogen oxides (SCR DeNOx).

In one embodiment of the process for the purification of a flue gas comprising dust, acidic impurities, such as hydrogen halides or sulphur oxides, and comprising nitrogen oxides (NOx), the flue gas is optionally first dedusted so that to remove at least part of dust, then a reactive composition according present invention is injected in the at least partly dedusted flue gas so that to absorb at least part of the acidic impurities, the resulting flue gas is then subsequently subjected to a filtration such as a bag filter to remove part of reacted reactive composition, and the flue gas is subsequently subjected to a selective catalytic reduction of nitrogen oxides (SCR DeNOx).

In the purification process according to the invention, the filtration can be performed using any filtering or separating means, for instance ceramic of metallic filters. Sleeve filters, in which the filtration takes place through a cloth, or electrostatic separators, or multi cyclones, are advantageous.

In the purification process according to the invention, it is recommended that the freeing of the flue gas from dust be carried out more than 2 seconds, advantageously from 3 to 6 seconds, after the introduction of the reactive composition into the flue gas.

In the purification process according to the invention, the filtration equipment can integrate also the catalyst for the SCR DeNOx operation. This, simplifies the process and reduces the investment costs.

In the following examples the ammonia content was measured by the alkaline distillation method.

EXAMPLE 1 (not conform)

Several samples of 120 kg of an ammoniacal sodium bicarbonate exiting from a Solvay process, exiting from a rotative filter after a carbonation column (such as described in Ullmann's Encyclopedia of Industrial Chemistry Sodium carbonate, page Vol. 33 page 307) comprising about 14% water and an ammonia content expressed as $NH_4^+$ are let to be dried on a polyethylene film one night at about 23° C. to obtain pre-dried ammoniacal sodium bicarbonate compositions with a water content of about 3% of water. The pre-dried ammoniacal sodium bicarbonate compositions are then introduced with hot air at 30° C. into a pin mill UPZ100 Hozokawa Alpine. The obtained compositions are then separated from the gas on a bag filter. The temperature of the gas exiting the bag filter is about 45° C. The obtained composition comprises (weight percentage): between 80% and 95% by weight of sodium bicarbonate, between 4% and 12% by weight of sodium carbonate and between 0.02% and 2.0% by weight of ammonia, and less than 1% of water. The measured laser particle size distribution of the obtained reactive composition indicates a $D_{90}$ of about 45+/−5 μm.

EXAMPLE 2.a (conform)

Same experiment as example 1 was performed except that the pre-dried ammoniacal sodium bicarbonate at about 3% of water, before being milled, is additivated with 0.2 w. % of stearic acid and mixed in a Denisen rotative mixer during one hour. The ammoniacal sodium bicarbonate mixed with 0.2 w. % of stearic acid is then introduced with the same conditions as example 1 with hot air (30° C.) into a pin mill UPZ100 Hozokawa Alpine. The obtained composition comprises between 80% and 95% by weight of sodium bicarbonate, between 4% and 12% by weight of sodium carbonate and between 0.02% and 2.0% by weight of ammonia, less than 1% of water, and 0.2% stearic acid.

EXAMPLE 2.b (conform)

Same experiment as example 2.a was performed except that the pre-dried ammoniacal sodium bicarbonate at about 3% of water, before being milled, is additivated with 0.5 w. % of calcium stearate and mixed in the Denisen rotative mixer during one hour. The ammoniacal sodium bicarbonate mixed with 0.5 w. % of calcium stearate is then processed as example 2.a. The obtained composition comprises between 80% and 95% by weight of sodium bicarbonate, between 4% and 12% by weight of sodium carbonate and between 0.02% and 2.0% by weight of ammonia, less than 1% of water, and 0.5% calcium stearate.

EXAMPLE 3 (comparative example)

200 grams of the different samples of reactive compositions comprising different ammonia content and obtained at example 1 (not conform without 0.01 to 5% of a compound selected from hydrocarbons, fatty alcohols, fatty acids, or fatty acid salts) or correspondent samples with an added compound from example 2.a (0.2% stearic acid) and example 2.b (0.5% calcium stearate) are then conditioned in a climatic chamber on a stainless steel plate with a powder thickness of 1.5+/−0.5 cm, during 40 minutes at different temperature and relative humidity (RH) conditions :
−25° C. and 40% RH
−25° C. and 75% RH
−50° C. and 75% RH Then part of the samples is introduced in 500 ml polyethylene bottles so that to fill about 250 ml of the reactive composition in powder form, and then to be able to measure the ammonia ($NH_3$) released in the atmosphere during storage.

The bottles are let during 40 minutes at room temperature (about 22° C.) so that the atmosphere of the bottle is enriched in ammonia gas. Then the gas present in the polyethylene bottle is pumped out with a determined gas volume (corrected from measured ambient atmospheric pressure) through Draeger tube to measure the ammonia ($NH_3$) content of the gas within the storage bottle (Draeger ammonia 5/a tubes range 5-600 ppm).

Results of the reactive compositions of example 1 and of examples 2.a and 2.b are reported in table 1 (25° C.-75% RH).

One can see from table 1 that the ammonia release ($NH_3$) in storage gas increases sensitively when total $NH_4^+$ of the sample increases.

When storage humidity conditions are increased, the ammonia ($NH_3$) release is increased.

Ammonia ($NH_3$) release during storage, as shown by the ammonia concentration measurement in the storage gas, is sensitively reduced when a compound selected from hydrocarbons, fatty alcohols, fatty acids, or fatty acid salts, such as in particular stearic acid or calcium stearate, is in the reactive composition.

Results at climatic conditioning of 50° C. 75% RH before storage are similar but with a lower ammonia ($NH_3$) release during storage conditions at ambient temperature (levels of 50-100 ppm from samples of example 1, and 49-75 ppm from samples of example 2.b).

EXAMPLE 4 (conform)

120 kg of an ammoniacal sodium bicarbonate from Solvay process, exiting from a rotative filter after a carbonation column (such as described in Ullmann's Encyclopedia of Industrial Chemistry Sodium carbonate, page Vol. 33 page 307) comprising 13.7% water is let to be dried on a polyethylene film one night at about 23° C. to obtain a 'dewatered' ammoniacal sodium bicarbonate with a water content of about 6% of water. The pre-dried ammoniacal sodium bicarbonate is then introduced with hot air at 80° C. into a pin mill UPZ 100 Hozokawa Alpine. The obtained composition is then separated from the gas on a bag filter. The temperature of the gas exiting the bag filter is 55° C. The obtained composition comprises (weight percentage): 89.8% $NaHCO_3$, 7.4% $Na_2CO_3$, 0.8% total ammonia expressed as $NH_4^+$, 0.06% water. The measured laser $D_{90}$ is 25 μm.

TABLE 1

Results with climatic conditioning at 25° C. - 75% RH from Example 3

| | | Nber | | | | | |
|---|---|---|---|---|---|---|---|
| | | 1 | 2 | 3 Ref | 4 | 5 | 6 |
| Samples | | 3601-15 | 3628-14 | 3601-14 | 3624-15 | 3601-15 | BNL |
| Total $NH_4^+$ content of sample % | % $NH_4^+$ | 0.48 | 0.61 | 0.58 | 0.38 | 0.64 | 0.96 |
| $NH_3$ gas concentration ppm | | | | | | | |
| Crude Bicarb. no compound (Example 1) | $NH_3$ ppm | 150 | 200 | 200 | 100 | 150 | >610 |
| Crude Bicarb. 0.5% Ca Stearate (Example 2b) | $NH_3$ ppm | 50 | 100 | 100 | 50 | — | 500 |
| Crude Bicarb. 0.2% Stearic acid (Example 2a) | $NH_3$ ppm | — | — | — | — | 100 | — |

EXAMPLE 5

Similar tests as the ones of example 3 have been realized, showing the effectiveness of other fatty acids with 12-20 carbons (conform to the invention) as other compounds as fatty acid with 22 carbons or fatty alcohols are less effective in reducing ammonia release during storage or handling of the reactive composition according to the invention.

A batch from crude sodium bicarbonate obtained from the ammonia Solvay process (comprising about 0.4% $NH_4^+$), was divided in 7 lots, each processed as in example 3, but replacing stearic acid or calcium stearate with other fatty acids added so that the reactive composition comprised 1% by weight of this compound.

Each lot of reactive composition was conditioned 40 minutes at 25° C. 75% relative humidity in a climatic chamber; for this, each lot was spread on a stainless steel plate with a layer of 1.5+/−0.5 cm of thickness.

Then part of the composition was taken and analyzed in remaining water content, 200 g sample of the pre-conditioned composition with measured and indicated water content in table 2, was introduced in polyethylene bottles of 500 ml volume, bottles were closed, put again in the climatic chamber at 25° C., and then after 40 minutes the bottles were opened and the gas in the bottles was extracted with a pump and gas counter, and the gas was measured in ammonia content (expressed in ppm by weight).

The results of ammonia concentration in the storage gas above the reactive compositions along with the water content of the reactive compositions are given in table 2.

TABLE 2

Results with climatic conditioning at 25° C.-75% RH and diverse compounds from Example 5.

| Samples | | Nber Ref | 4' 3624 |
|---|---|---|---|
| Total $NH_4^+$ content of sample % | % wt $NH_4^+$ | | 0.40 |
| Crude Bicarb. grinded no compound | $NH_3$ Gas concentration (ppm) | 100 | |
| | Water content (% wt) | 0.14 | |
| Crude Bicarb. grinded 0.5% w calcium stearate (SO.G.I.S) | $NH_3$ Gas concentration (ppm) | 50 | |
| | Water content (% wt) | 0.4 | |
| Crude Bicarb. grinded 1% lauric acid ($C_{12}H_{24}O_2$) (Merck Chemicals) | $NH_3$ Gas concentration (ppm) | 75 | |
| | Water content (% wt) | 0.17 | |
| Crude Bicarb. grinded 1% behenic acid ($C_{22}H_{44}O_2$) (Alpha Aesar GmbH) | $NH_3$ Gas concentration (ppm) | 175 | |
| | Water content (% wt) | 0.05 | |
| Crude Bicarb. grinded 1% oleic acid ($C_{18}H_{34}O_2$) (Sigma-Aldrich) | $NH_3$ Gas concentration (ppm) | 50 | |
| | Water content (% wt) | 0.13 | |
| Crude Bicarb. grinded 1% stearic alcohol ($C_{18}H_{38}O$) (Merck Chemicals) | $NH_3$ Gas concentration (ppm) | 200 | |
| | Water content (% wt) | 0.02 | |
| Crude Bicarb. grinded 1% déhydol LT7 (Polyglycol ether C12-18 with ethoxylated oxide) (BASF) | $NH_3$ Gas concentration (ppm) | 100 | |
| | Water content (% wt) | 0.03 | |

The invention claimed is:

1. A reactive composition comprising between 60% and 98% by weight of sodium bicarbonate, between 1% and 12% by weight of sodium carbonate and between 0.02% and 2.0% by weight of ammonia, expressed in the form of ammonium ions $NH_4^+$, and comprising from 0.01 to 5% by weight of a compound selected from the group consisting of fatty acids having 12 to 20 carbon atoms per molecule and a salt thereof.

2. A reactive composition comprising between 60% and 98% by weight of sodium bicarbonate, between 1% and 40% by weight of sodium carbonate, between 0.02% and 2.0% by weight of ammonia and from 0.01 to 5% by weight of a compound selected from the group consisting of fatty acids having 12 to 20 carbon atoms per molecule and a salt thereof, wherein the ammonia expressed in the form of ammonium ions $NH_4^+$ is defined as being gaseous ammonia ($NH_3$) released from a product sample by heating at 30° C. during two hours and capturing the released gaseous ammonia ($NH_3$) from the heating operation by condensation in a scrubber with HCl solution to transform the ammonia into $NH_4^+$, which is analyzed by a colorimeter.

3. The reactive composition according to claim 2, comprising between 1% and 12% by weight of sodium carbonate.

4. A reactive composition comprising between 60% and 98% by weight of sodium bicarbonate, between 1% and 40% by weight of sodium carbonate and between 0.02% and 2.0% by weight of ammonia, expressed in the form of ammonium ions $NH_4^+$, and comprising from 0.01 to 5% by weight of a compound selected from the group consisting of hydrocarbons, fatty alcohols, fatty acids, and fatty acid salts.

5. The composition according to claim 4, comprising between 80 and 98%, by weight of sodium bicarbonate.

6. The composition according to claim 4, comprising between 1% and 12% by weight of sodium carbonate.

7. The composition according to claim 4, comprising between 85% and 95% by weight of sodium bicarbonate.

8. The composition according to claim 4, being in the form of particles having a diameter $D_{90}$ of less than 50 μm and a diameter $D_{50}$ of less than 35 μm, measured by laser diffractometry.

9. The composition according to claim 4, comprising from 0.02% to 0.17% by weight of ammonia, expressed in the form of ammonium ions $NH_4^+$.

10. The composition according to claim 4, comprising from 0.2% to 0.7% by weight of ammonia, expressed in the form of ammonium ions $NH_4^+$.

11. The composition according to claim 4, comprising more than 0.7% and less than 2.0% by weight of ammonia, expressed in the form of ammonium ions $NH_4^+$.

12. The composition according to claim 4, further comprising less than 1% by weight of water.

13. The composition according to claim 4, being a powder with a free flowing density of at least 0.4 kg/dm$^3$ and at most 0.8 kg/dm$^3$.

14. The composition according to claim 4, wherein the compound is selected from the group consisting of fatty acids having 12 to 20 carbon atoms per molecule and a salt thereof.

15. The composition according to claim 14, wherein the fatty acid salt is a magnesium or calcium salt or a fatty acid soap.

16. The composition according to claim 14, wherein the fatty acid is selected from the group consisting of lauric acid, myristic acid, palmitic acid, stearic acid, oleic acid, linoleic acid and mixtures thereof.

17. A process for purification of a flue gas comprising acidic impurities, comprising:
  introducing the reactive composition according to claim 4 into the flue gas, at a temperature of 100 to 600° C., and subsequently subjecting the flue gas to a filtration or a dedusting.

18. The process according to claim 17, wherein the flue gas is subjected to a filtration and is subsequently subjected to a selective catalytic reduction of nitrogen oxides (SCR DeNOx).

19. A process for producing the composition according to claim 14, comprising:
  a) mixing particles resulting from crude bicarbonate particles from an ammonia-soda plant comprising from 1% to 20% by weight of water with a compound selected from the group consisting of fatty acids having 12 to 20 carbon atoms per molecule and a salt thereof to form a humid mixture comprising particles,
  b) introducing the humid mixture comprising particles into a gas stream at a temperature of more than 30° C. in order to form a gas stream laden with particles; and
  c) introducing the gas stream laden with particles into a mill in order to form a gas stream comprising ground particles having a diameter $D_{90}$ of less than 100 μm and a $D_{50}$ of less than 75 μm measured by laser diffractometry.

20. A method to reduce ammonia release during storage or during handling of the reactive composition of claim 14 comprising between 60% and 98% by weight of sodium bicarbonate, between 1% and 40% by weight of sodium carbonate and between 0.02% and 2.0% by weight of ammonia, expressed in the form of ammonium ions $NH_4^+$, said method comprising using the compound selected from the group consisting of fatty acids having 12 to 20 carbon atoms per molecule and a salt thereof as additive in the reactive composition.

* * * * *